(12) United States Patent
Mao et al.

(10) Patent No.: US 12,080,319 B2
(45) Date of Patent: Sep. 3, 2024

(54) WEAKLY-SUPERVISED SOUND EVENT DETECTION METHOD AND SYSTEM BASED ON ADAPTIVE HIERARCHICAL POOLING

(71) Applicant: Jiangsu University, Jiangsu (CN)

(72) Inventors: Qirong Mao, Jiangsu (CN); Lijian Gao, Jiangsu (CN); Yaxin Shen, Jiangsu (CN); Qinghua Ren, Jiangsu (CN); Yongzhao Zhan, Jiangsu (CN); Keyang Cheng, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/035,934

(22) PCT Filed: Jun. 27, 2022

(86) PCT No.: PCT/CN2022/101361
§ 371 (c)(1),
(2) Date: May 9, 2023

(87) PCT Pub. No.: WO2023/221237
PCT Pub. Date: Nov. 23, 2023

(65) Prior Publication Data
US 2024/0105211 A1    Mar. 28, 2024

(30) Foreign Application Priority Data
May 16, 2022    (CN) .......................... 202210528373.0

(51) Int. Cl.
*G10L 25/78*    (2013.01)
*G10L 25/18*    (2013.01)
*G10L 25/30*    (2013.01)

(52) U.S. Cl.
CPC .............. *G10L 25/78* (2013.01); *G10L 25/18* (2013.01); *G10L 25/30* (2013.01)

(58) Field of Classification Search
CPC ........................................................ G10L 25/78
(Continued)

(56) References Cited

U.S. PATENT DOCUMENTS

| 2016/0145379 | A1* | 9/2016 | Patel ....................... G06F 19/00 704/200 |
| 2017/0372725 | A1* | 12/2017 | Khoury .................... G10L 25/45 |
| 2020/0213728 | A1* | 7/2020 | Lopatka ................ G01S 3/8083 |

FOREIGN PATENT DOCUMENTS

| CM | 110827804 | 2/2020 |
| CN | 108648748 | 10/2018 |

(Continued)

OTHER PUBLICATIONS

Adaptive pooling operators for weakly labeled sound event detection, Authors: McFee, Brian « Salamon, Justin Bello, Juan Pablo (Year: 2018) (Year: 2018).*

(Continued)

*Primary Examiner* — Bharatkumar S Shah
(74) *Attorney, Agent, or Firm* — JCIPRNET (57) ABSTRACT

The present disclosure provides a weakly-supervised sound event detection method and system based on adaptive hierarchical pooling. The system includes an acoustic model and an adaptive hierarchical pooling algorithm module (AHPA-model), where the acoustic model inputs a pre-processed and feature-extracted audio signal, and predicts a frame-level prediction probability aggregated by the AHPA-module to obtain a sentence-level prediction probability. The acoustic model and a relaxation parameter are jointly optimized to obtain an optimal model weight and an optimal relaxation parameter based for formulating each category of sound event. A pre-processed and feature-extracted unknown audio signal is input to obtain frame-level prediction probabilities of all target sound events (TSEs), and sentence-level prediction probabilities of all categories of (Continued)

TSEs are obtained based on an optimal pooling strategy of each category of TSE. The disclosure has good versatility in being applicable to audio classification, complex acoustic scene, and locating in weakly-supervised sound event detection.

18 Claims, 4 Drawing Sheets

(58) Field of Classification Search
USPC .......................................................... 704/200
See application file for complete search history.

(56) References Cited

FOREIGN PATENT DOCUMENTS

| | | | |
|---|---|---|---|
| CN | 111933188 | 11/2020 | |
| CN | 112036477 | 12/2020 | |
| CN | 112786029 | 5/2021 | |
| CN | 113707175 | 11/2021 | |
| GB | 2616363 A | * 9/2023 | ........... G06N 3/0895 |

OTHER PUBLICATIONS

"International Search Report (Form PCT/ISA/210) of PCT/CN2022/101361", mailed on Dec. 26, 2022, pp. 1-5.

* cited by examiner

WEAKLY-SUPERVISED SOUND EVENT DETECTION METHOD AND SYSTEM BASED ON ADAPTIVE HIERARCHICAL POOLING

CROSS-REFERENCE TO RELATED APPLICATION

This application is a 371 of international application of PCT application serial no. PCT/CN2022/101361, filed on Jun. 27, 2022, which claims the priority benefit of China application serial no. 202210528373.0, filed on May 16, 2022. The entirety of each of the above-mentioned patent applications is hereby incorporated by reference herein and made a part of this specification.

TECHNICAL FIELD

The present disclosure relates to the technical field of sound event detection in artificial intelligence technologies, and specifically, to a weakly-supervised sound event detection method and system based on adaptive hierarchical pooling.

BACKGROUND

One of most important tasks in weakly-supervised sound event detection is to design an pooling function. The pooling function is used to infer a sentence-level probability based on a frame-level probability sequence predicted by a model, that is, infer "category information" of an event based on predicted "locating information", to effectively model a weakly-labeled audio sample. At present, there are roughly two types of mainstream pooling functions: a maximum pooling function and a weighted averaging pooling function. In maximum pooling, most significant information in a signal is captured to achieve excellent performance for audio classification. However, because a locating boundary of a maximum pooling detection event is always incomplete, resulting in poor locating performance, which is reflected by lots of missing detections. In order to overcome a defect of the maximum pooling in an audio locating task, various types of weighted averaging pooling algorithms have been developed. In weighted averaging pooling, weighted averaging is performed on all frame-level probabilities to obtain a sentence-level prediction. This pooling method considers all the frame-level probabilities instead of only focusing on significant information, and therefore can recall more positive sample frames (namely, event activation frames), and can achieve good performance in an audio locating sub-task. In addition, the weighted averaging pooling also takes event-independent information into account, which causes interference information to the audio classification, resulting in suboptimal audio classification performance. Actually, no single pooling method can provide an optimal strategy for all categories of events. For example, the weighted averaging pooling is more suitable for a continuous long-time event (such as music), while for some short events (such as dog barking), the maximum pooling needs to be performed to focus on a most significant audio frame. Obviously, a design of an pooling strategy should adapt to a natural characteristic of a sound event.

In recent years, an adaptive pooling method has been gradually proposed. For example, both automatic pooling proposed by McFee et al. and factorial pooling proposed by Zhang et al. use an adaptive weighted Softmax pooling method. In Softmax pooling, a learnable parameter is multiplied by a frame-level probability, and different categories of events have different weights. However, these two types of adaptive methods essentially use different weights to reconcile the maximum pooling and the weighted averaging pooling, and can neither effectively consider audio classification and audio location tasks at the same time, and nor effectively learn a customized pooling strategy for each category of event, resulting in poor performance of weakly-supervised audio event detection.

SUMMARY

In order to overcome the shortcomings in the prior art, the present disclosure provides a weakly-supervised sound event detection method and system based on adaptive hierarchical pooling, to automatically learn an optimal pooling strategy for each category of event through a hierarchical structure and a continuous relaxation method, which can not only capture significant information of a plurality of clips, but also retain a complete locating boundary, thereby improving performance of both audio classification and audio locating in weakly-supervised sound event detection.

The present disclosure achieves the above technical objective through following technical solutions.

A weakly-supervised sound event detection method based on adaptive hierarchical pooling specifically includes:

extracting an acoustic feature of a pre-processed audio signal, inputting the acoustic feature to an acoustic model, dividing a frame-level prediction probability sequence predicted by the acoustic model into a plurality of consecutive sub-bags, calculating significant information of each of the sub-bags through maximum pooling to obtain a sub-bag-level prediction set, and obtaining an average probability of the sub-bag-level prediction set through mean pooling as a sentence-level prediction probability;

jointly optimizing the acoustic model and a relaxation parameter until convergence to obtain an optimal model weight and an optimal relaxation parameter, and formulating an optimal pooling strategy for each category of sound event based on the optimal relaxation parameter; and performing pre-processing and feature extraction on a given unknown audio signal to obtain a pre-processed audio signal, inputting the processed audio signal to a trained acoustic model to obtain frame-level prediction probabilities of all target sound events to complete an audio locating task, and obtaining sentence-level prediction probabilities of all categories of the target sound events based on the optimal pooling strategy of each category of the target sound events to complete an audio classification task.

Further, the formulating of the optimal pooling strategy specifically includes: calculating, according to $\lambda=\{\text{softmax}(\alpha_k); \forall k\}$, probabilities $\lambda^*$ corresponding to different values of R under the optimal relaxation parameter, where for a $k^{th}$ category of sound event, R corresponding to a maximum selection probability in $\lambda^*_k$ is an optimal sub-bag quantity $R^*_k$ of a current category, $\lambda$ represents a probability set, R represents a sub-bag quantity, a k represents a $k^{th}$-dimensional relaxation parameter, and softmax( ) represents an operator.

Further, when the sub-bag quantity is R, a sentence-level prediction probability of the $k^{th}$ category of sound event is expressed as follows:

$$\hat{Y}_k = \phi_{hi}(F_w(X)_k, R) = \phi_{avg}(\{\phi_{max}(b_r); \forall_r\})$$

where $\hat{Y}_k$ represents the sentence-level prediction probability of the $k^{th}$ category of sound event, $\phi_{hi}$ represents an adaptive hierarchical pooling algorithm, $F_w$ represents the acoustic model, $\phi_{avg}$ represents the mean pooling, $\phi_{max}$ represents the maximum pooling, and $b_r$ represents an $r^{th}$ element in a sub-bag set B.

Further, an expected sentence-level prediction probability $\overline{Y}_k$ of the $k^{th}$ category of sound event is expressed as follows:

$$\overline{Y}_k = \Sigma_{R \in N^+} \{\lambda_k^R * \phi_{hi}(F_w(X)_k, R)\}$$

where $\lambda_k^R$ represents a probability of selecting R sub-bags for the $k^{th}$ category of event, and $N^+$ represents a set of all optional sub-bag quantities.

Further, the jointly optimizing of the acoustic model and the relaxation parameter is performed through back propagation:

$$L(W, \alpha; X, Y) = \frac{1}{K}\sum_{k}^{K} BCELoss(\overline{Y}_k, Y_k)$$

where L represents an average prediction error of all sound event categories, W and $\alpha$ respectively represent a model parameter and the relaxation parameter, X and Y respectively represent a Mel spectrogram feature input to the model and a sentence-level label, $Y_k$ represents a sentence-level label of the $k^{th}$ category of sound event, BCELoss represents a binary cross-entropy function, and K represents a total quantity of the sound event categories.

Further, the acoustic model is an arbitrary mainstream deep learning model, and a benchmark model of the acoustic model is a convolutional recurrent neural network (CRNN) model.

Further, the extracted feature is a Mel spectrogram feature.

Further, the acoustic model is trained and verified through a DCASE2017 dataset.

Further, the audio signal is down-sampled to 16 kHz, a frame length and a frame shift are set to 1024 and 664 respectively, 240 frame samples are obtained for each signal after framing, and the Mel spectrogram feature has 64 dimensions.

A weakly-supervised sound event detection system based on adaptive hierarchical pooling includes: an acoustic model and an adaptive hierarchical pooling algorithm module that are successively connected, where a pre-processed and feature-extracted audio signal is input to the acoustic model, the acoustic model predicts a frame-level prediction probability, and the adaptive hierarchical pooling algorithm module aggregates the frame-level prediction probability to obtain a sentence-level prediction probability.

In the figures, 1: original audio signal; 2: signal pre-processing; 3: Mel spectrogram feature; 4: CRNN; 5: adaptive hierarchical pooling algorithm module; 6. long short term memory (LSTM) network; 7: convolutional layer; 8: normalization layer; 9: ReLU activation layer.

DETAILED DESCRIPTION OF THE EMBODIMENTS

The present disclosure will be further described below in conjunction with the accompanying drawings and specific embodiments, but the protection scope of the present disclosure is not limited thereto.

Figure 1:
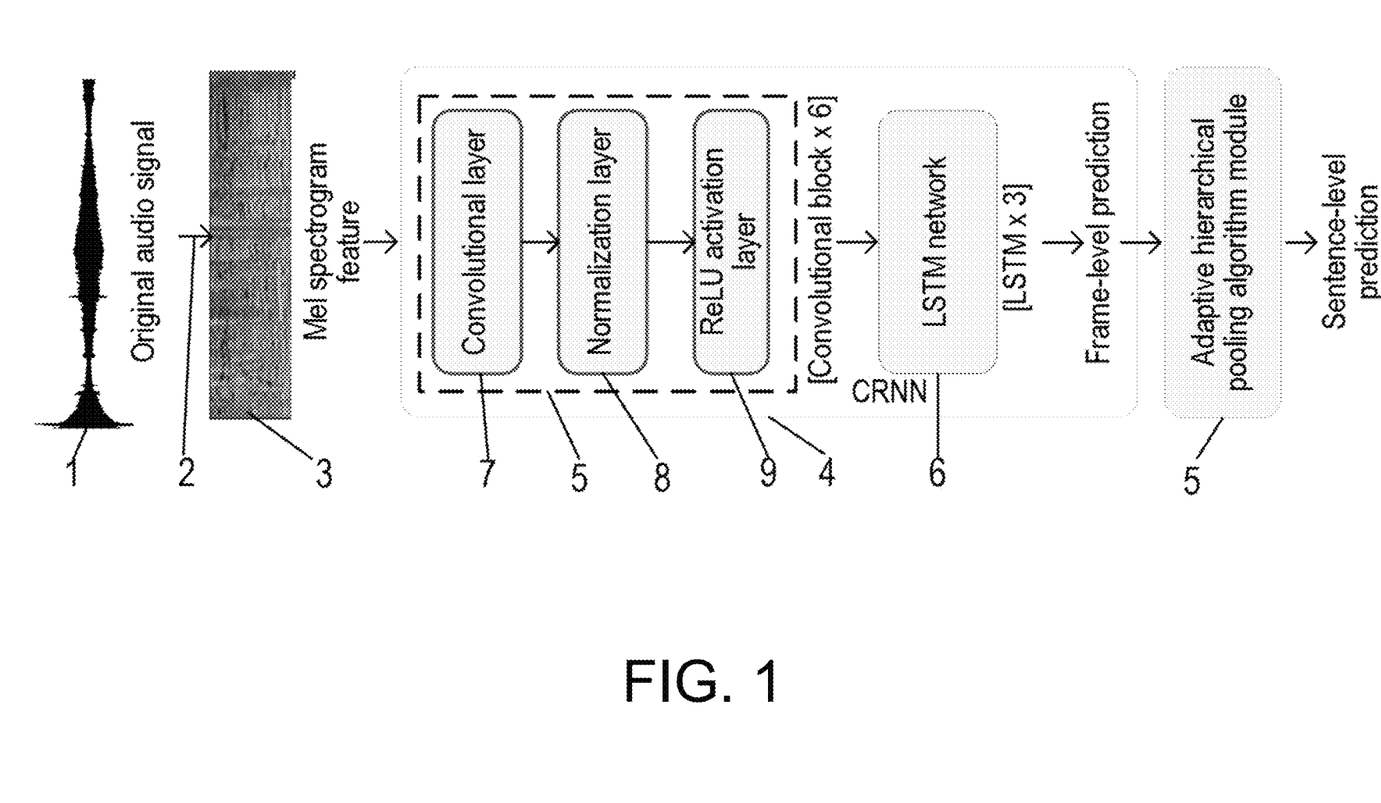
FIG. 1 is a frame diagram of a weakly-supervised sound event detection system based on adaptive hierarchical pooling according to the present disclosure.

As shown in FIG. 1, a weakly-supervised sound event detection system based on adaptive hierarchical pooling in the present disclosure includes an acoustic model and an adaptive hierarchical pooling algorithm module 5 that are successively connected. A stream transmission process of an audio signal includes signal pre-processing, acoustic feature extraction, the acoustic model, and hierarchical pooling in turn. During the signal pre-processing 2, a high-dimensional and complex original audio signal 1 is processed to obtain a low-dimensional, short-time, and continuous signal frame sequence that facilitates subsequent processing. During the acoustic feature extraction, a Mel spectrogram feature 3 that conforms to a characteristic of a human ear is extracted for each frame sample, and redundant information is initially filtered to improve modeling efficiency of the acoustic model. The acoustic model may be any mainstream deep learning model, and a benchmark model of the acoustic model is a CRNN model. In this embodiment, a CRNN 4 is selected. The CRNN 4 is composed of six convolutional blocks and a three-layer LSTM network. Each convolutional block contains a convolutional layer 7, a normalization layer 8, and an ReLU activation layer 9. A sequence of the extracted Mel spectrogram feature 3 is input to the CRNN 4 to obtain a frame-level prediction probability sequence, in other words, locating information of a sound event. Then, the adaptive hierarchical pooling algorithm module 5 calculates a sentence-level prediction probability, in other words, classification information of the sound event.

Figure 2:
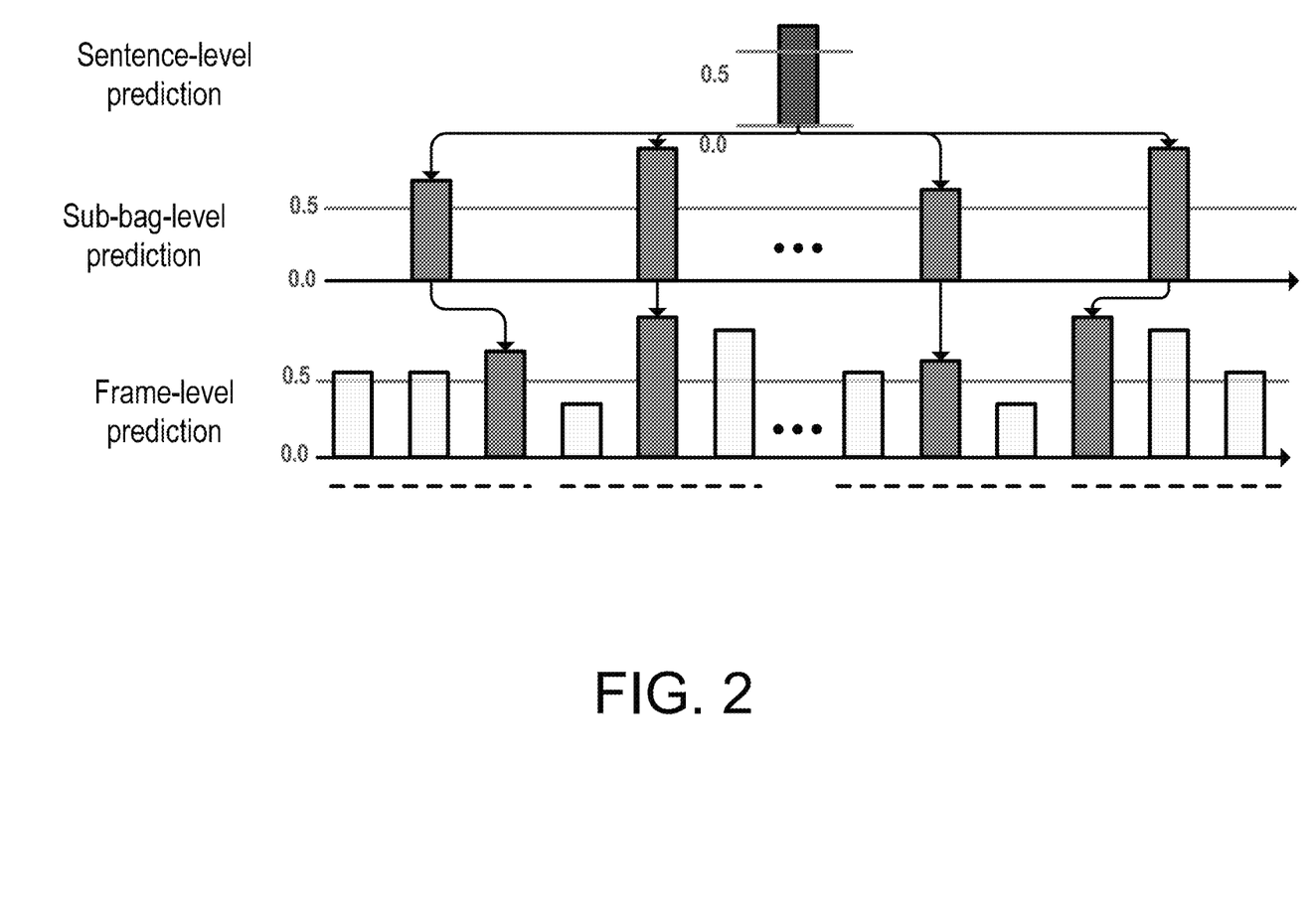
FIG. 2 is a flowchart of an adaptive hierarchical pooling algorithm according to the present disclosure.

FIG. 2 shows a process of gradually aggregating the frame-level prediction probability to obtain the sentence-level prediction probability from bottom to top, and shows a gradient propagation path of back propagation from top to bottom, where a grayscale represents a gradient magnitude.

During the signal pre-processing 2, an original signal is first resampled at a specific sampling rate, pre-emphasis is performed after sampling to compensate for energy of a high-frequency component, framing is performed based on a specified frame length to obtain a plurality of consecutive short frame samples, and finally windowing is performed on each frame sample to smooth a frame signal, prevent energy leakage, and obtain a short-time continuous signal frame sequence to complete the signal pre-processing process. A specific process is as follows: A signals is selected from a large-scale weakly-labeled sound event dataset proposed by a DCASE2017 challenge, where a sampling rate of the original signal s is 22.5 kHz, and the original signal is down-sampled to 16 kHz to reduce complexity. The signal s needs to be pre-processed to increase high-frequency resolution before being received by the CRNN 4. Data duration in the DCASE17 dataset is 10 seconds, that is, there are a total of 160,000 sampling points in the above signal s. In this case, the framing needs to be performed to reduce computational complexity. In the present disclosure, the frame length is set to 1024 sampling points (64 ms), and a frame shift is set to 664 sampling points (41.5 ms), in other words, an overlap of 22.5 ms is reserved before and after each frame to ensure smoothness of the frame signal. After the framing, each 10 s signal contains 240 frame samples: $s'=\{s'_1, s'_2, \ldots, s'_{240}\}$. Finally, each frame sample is windowed to complete the signal pre-processing process. After that, each frame of time-domain signal is converted into a frequency through short-time Fourier transform (STFT), and each frame of signal is filtered through 64 Mel filters, to obtain the 64-dimensional Mel spectrogram feature 3. In other words, for each signal, an input feature of the CRNN has 240*64 dimensions.

The CRNN 4 is represented by $F_w$. The frame-level prediction probability can be obtained through a given input feature X, namely, $\hat{y}=F_w(X)$. According to the process shown in FIG. 2, an adaptive hierarchical pooling algorithm $\phi_{hi}$ is also needed to aggregate $\hat{y}$ into the sentence-level prediction probability $\hat{Y}$, to construct a prediction error (formula (6)) and a training model. At a test stage, the CRNN 4 performs forward calculation based on a determined optimal model weight and optimal pooling strategy to detect a sound event of unknown data. A specific process is as follows:

1) First, since each signal is 240 frames long, an optional sub-bag quantity R in adaptive hierarchical pooling is a set $N^+$ of all factors of 240, namely, $N^+=\{1, 2, 3, \ldots, 120, 240\}$. A continuous relaxation method is used to convert a discrete search space of the optional sub-bag quantity into an optimizable continuous search space, which can be jointly optimized together with the CRNN 4 to automatically select an optimal sub-bag quantity for each category of sound event, in other words, to adaptively customize an optimal pooling strategy for a specific event.

2) A set of low-dimensional and learnable relaxation parameters is specified for each category of sound event to correspond to all elements in the discrete search space, probabilities of selecting all alternatives in the search space are obtained through Softmax activation, and the discrete space is traversed based on the probabilities to obtain an activation expectation of each category of sound event, to make the discrete search space continuous and relaxed.

Specifically, it is assumed that there are K categories of sound events in the DCASE2017 dataset, and a search space size is N (namely, a quantity of elements in $N^+$). A set of learnable parameters $\alpha \in R^{K \times N}$ is used to relax the discrete search space to obtain a set $\lambda$ of probabilities corresponding to different values of R:

$$\lambda = \{\text{softmax}(\alpha_k); \forall k\} \quad (1)$$

where $\alpha_k$ represents a $k^{th}$-dimensional relaxation parameter, and softmax( ) represents an operator.

3) A $k^{th}$ category of sound event is taken as an example. An element in $N^+$ is selected as a currently determined sub-bag quantity R, and the frame-level prediction probability $\hat{y}$ is segmented to R consecutive sub-bags to obtain a sub-bag set $B=\{b_1, b_2, \ldots, b_R\}$. As shown in FIG. 2, frame samples contained in each black dotted line belong to a same sub-bag. A maximum probability value, namely, most significant information, in each sub-bag is calculated through maximum pooling $\phi_{max}$ to obtain a sub-bag-level prediction set $\hat{p}$:

$$\hat{p} = \{\phi_{max}(b_r); \forall r\} \quad (2)$$

where $b_r$ represents an $r^{th}$ element in the sub-bag set B.

4) After that, an average probability of the sub-bag-level prediction set is taken as a final sentence-level prediction probability $\hat{Y}$ through mean pooling $\phi_{avg}$:

$$\hat{Y} = \phi_{avg}(\hat{p}) \quad (3)$$

Finally, when the sub-bag quantity is R, an activation probability (namely, the sentence-level prediction probability of the $k^{th}$ category of sound event may be expressed as follows:

$$\hat{Y}_k = \phi_{hi}(F_w(X)_k, R) = \phi_{avg}(\{\phi_{max}(b_r); \forall_r\}) \quad (4)$$

The sub-bag quantity R determines an pooling strategy. A larger sub-bag quantity leads to a smaller proportion of the maximum pooling and a larger proportion of the mean pooling, in other words, more attention to global information. A smaller sub-bag quantity leads to a larger proportion of the maximum pooling and a smaller proportion of the mean pooling, in other words, more attention to local significant information. The adaptive hierarchical pooling is performed to automatically learn the sub-bag quantity for each category of sound event to implement a customized pooling strategy for a specific event.

5) The processes 3) and 4) are repeated to traverse all optional sub-bag quantities in $N^+$, namely, $R \leftarrow N^+$, to obtain sentence-level prediction probabilities of the $k^{th}$ category of sound event in all cases, and an expected activation probability of the $k^{th}$ category of sound event is obtained in combination with the probability obtained according to the formula (1):

$$\overline{Y}_k = \Sigma_{R \in N^+} \{\lambda_k^R * \phi_{hi}(F_w(X)_k, R)\} \quad (5)$$

where $\lambda_k^R$ represents a probability of selecting R sub-bags for the $k^{th}$ category of event.

6) Prediction errors L of all categories are calculated through a binary cross-entropy function (BCELoss), back propagation is completed, and a model parameter and the relaxation parameter are jointly optimized (in a training stage, a trained model is the prior art) until convergence:

$$L(W, \alpha; X, Y) = \frac{1}{K} \sum_k^K BCELoss(\overline{Y}_k, Y_k) \quad (6)$$

where W and $\alpha$ respectively represent the model parameter and the relaxation parameter, X and Y respectively represent the Mel spectrogram feature input to the model and a sentence-level label, and $Y_k$ represents a sentence-level label of the $k^{th}$ category of sound event.

7) After the above joint optimization process based on the continuous relaxation method is completed, the optimal model weight $W^*$ and the optimal relaxation parameter $\alpha^*$ can be obtained. Probabilities $\lambda^*$ corresponding to different values of R under the optimal relaxation parameter can be calculated according to the formula (1). At this moment, for the $k^{th}$ category of sound event, R corresponding to a maximum selection probability in $\lambda^*_k$ is an optimal sub-bag quantity $R^*_k$ of the current category. So far, the adaptive hierarchical pooling algorithm has customized an optimal pooling strategy $\phi^*_{hi}$ for each category of sound event. When the continuous relaxation method is used for joint optimization, only one set of low-dimensional relaxation parameters needs to be introduced to complete the joint optimization efficiently. A quantity of relaxation parameters is greatly smaller than that of model parameters, and the optimization only needs to focus on natural properties of the sound event, such as a time length, a cycle, and other global characteristics, without paying attention to high-dimensional signal content. Therefore, convergence is easy to achieve, to guide the model parameter to quickly converge to global optimization under the optimal pooling strategy.

The optimal pooling strategy can also be found by manually selecting the sub-bag quantity and repeatedly training the CRNN, but computational complexity of this method is as high as $O(N^K)$, where N represents a value of the optional sub-bag quantity in the search space, and K represents a quantity of sound event categories. The present disclosure uses the continuous relaxation method for the joint optimization, and only needs to introduce the one set of low-dimensional relaxation parameters to reduce the computational complexity to $O(N)$.

The adaptive hierarchical pooling is an independent module controlled by a set of independent and learnable parameters. An input of the module is an audio locating result predicted by the model, and an output is an audio classification result. The adaptive hierarchical pooling method can be conveniently and effectively embedded into any acoustic model to detect a weakly-supervised audio event. The CRNN is used as the benchmark model to learn multi-scale acoustic features of spatial and temporal context features simultaneously, which is a mainstream model framework in the field of acoustic event detection.

The above process completes the joint optimization of the CRNN 4 and the adaptive hierarchical pooling algorithm. In the test stage of the CRNN 4, after pre-processing and feature extraction are performed on a given unknown sound signal, a processed sound signal is sent into a trained CRNN $F_{w^*}$ to obtain locating outputs (frame-level prediction probabilities) of all to-be-detected target events to complete an audio locating task, and activation probabilities (sentence-level prediction probabilities) of all categories are obtained based on a specific optimal pooling strategy $\phi^*_{hi}$ of each category of event to complete an audio classification task.

Figure 3A:
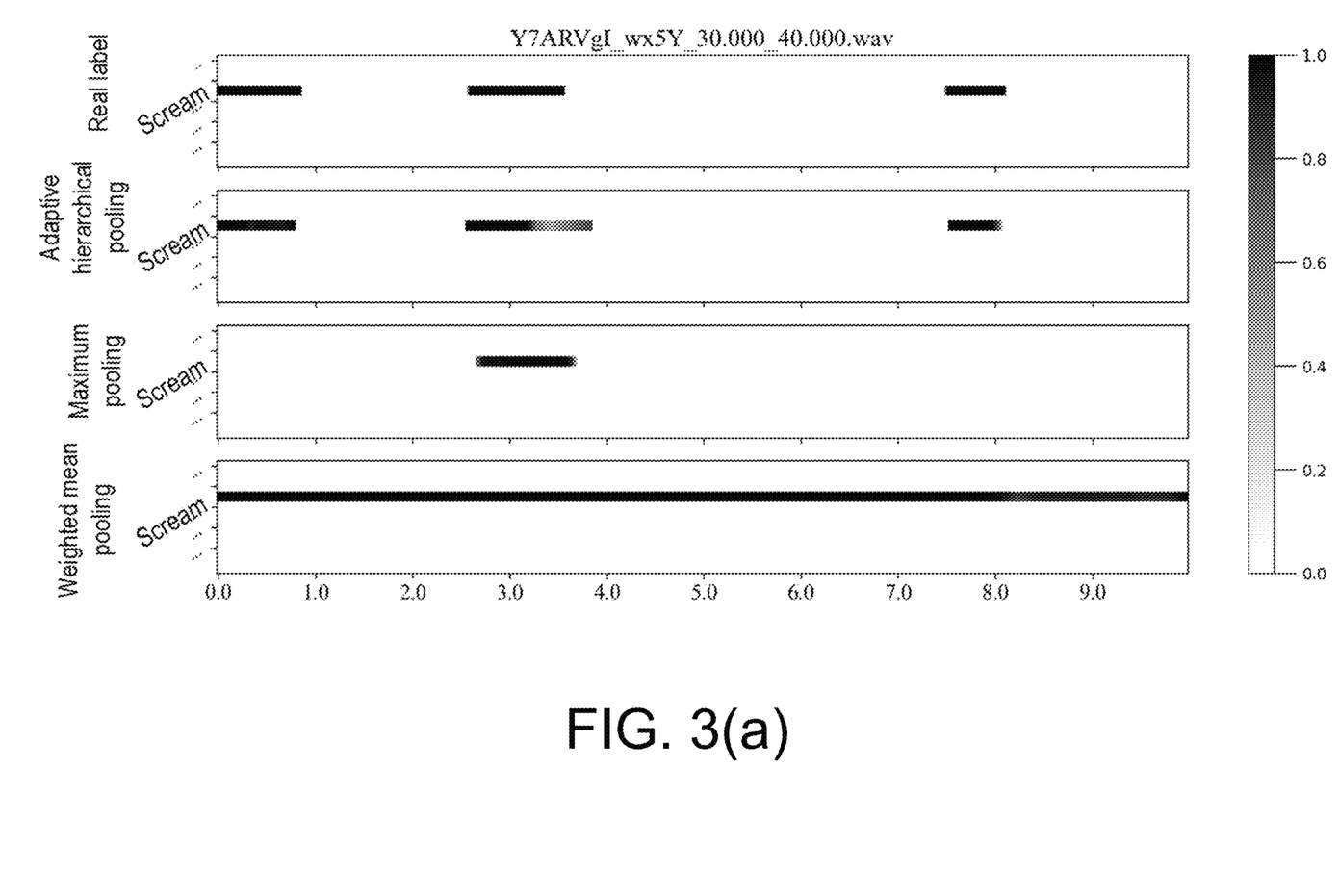
FIG. 3(a) is a first diagram comparing visual results of weakly-supervised sound event detection according to the present disclosure.
Figure 3B:
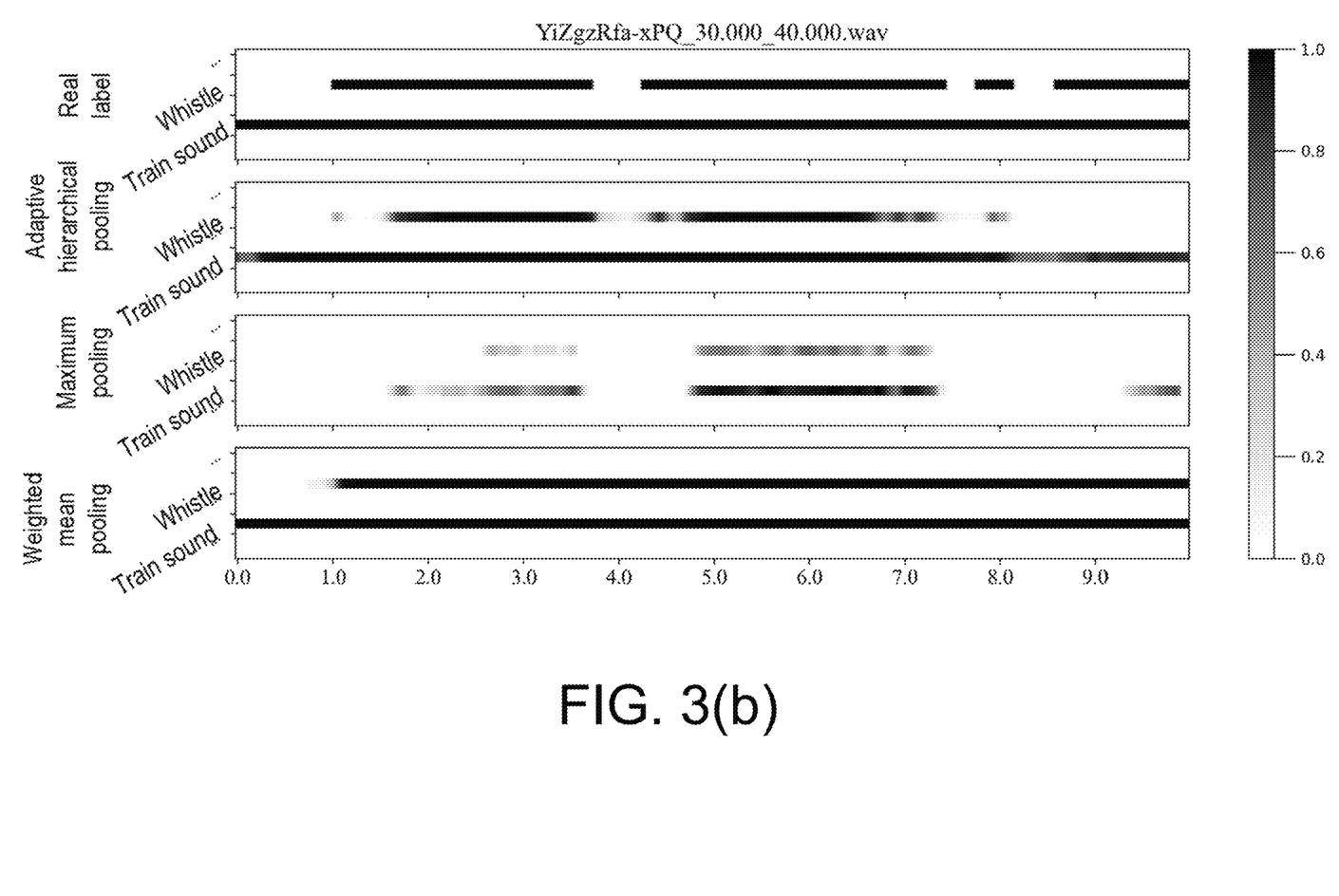
FIG. 3(b) is a second diagram comparing visual results of weakly-supervised sound event detection according to the present disclosure.

FIG. 3(a) and FIG. 3(b) show visual sound event locating results of two typical audio signals. Comparison methods are the maximum pooling and the weighted averaging pooling. The maximum pooling can only capture a significant region and cause an incomplete locating boundary, especially when detecting a long-time sound event (such as "train sound"), while the weighted averaging pooling always leads to many false detections, especially when detecting a short or multi-clip sound event (such as "scream" and "whistle"). Locating effects of three typical sound events in FIG. 3(a) and FIG. 3(b) all verify that the adaptive hierarchical pooling can not only capture significant information of a plurality of clips to discard redundant information, but also reduce a false detection rate and ensure a complete locating boundary to achieve optimal sound event detection performance.

Based on a same inventive concept as the weakly-supervised sound event detection method based on adaptive hierarchical pooling, the present disclosure further provides an electronic device. The electronic device includes one or more processors and one or more memories. The memory stores computer-readable code, and the computer-readable code is executed by the one or more processors to implement the weakly-supervised sound event detection method based on adaptive hierarchical pooling. The memory may include a non-volatile storage medium and an internal memory. The non-volatile storage medium may store an operating system and the computer-readable code. The computer-readable code includes a program instruction. When the program instruction is executed, the processor executes any weakly-supervised sound event detection method based on adaptive hierarchical pooling. The processor is configured to provide computing and control capabilities to support operation of the entire electronic device. The memory provides an environment for operation of the computer-readable code in the non-volatile storage medium. When the computer-readable code is executed by the processor, the processor executes any weakly-supervised sound event detection method based on adaptive hierarchical pooling.

It should be understood that the processor may be a central processing unit (CPU), another general purpose processor, a digital signal processor (DSP), an application-specific integrated circuit (ASIC), a field-programmable gate array (FPGA) or another programmable logic device, a discrete gate, a transistor logic device, or a discrete hardware component. The general purpose processor may be a microprocessor, or the processor may be any conventional processor or the like.

The computer-readable storage medium may be an internal storage unit of the electronic device described in the foregoing embodiment, such as a hard disk or memory of the electronic device. The computer-readable storage medium may alternatively be an external storage device of the electronic device, such as a plug-in hard disk, a SmartMedia card (SMC), a secure digital (SD) card, or a flash card equipped on the electronic device.

The present disclosure has following beneficial effects.

(1) The adaptive hierarchical pooling algorithm in the present disclosure first obtains significant information of a plurality of audio clips, which breaks a limitation that a maximum pooling method can only capture a most significant clip of a signal, and expands a sensing region during locating. Secondly, weighted averaging is performed on only the significant information of the clips to obtain a final prediction, which resolves a problem of noise caused by the weighted averaging pooling that considers all frame signals. Therefore, the adaptive hierarchical pooling algorithm has a capability of ensuring a complete locating boundary while capturing the significant information of the clips, which makes the adaptive hierarchical pooling algorithm suitable for two sub-tasks of weakly-supervised sound event detection: audio classification and audio locating.

(2) The adaptive hierarchical pooling in the present disclosure uses the continuous relaxation method to jointly learn the optimal model weight and the optimal pooling strategy of each category of sound event. A short sound event (such as "gunshot") usually only last for a short-time clip. In this case, the maximum pooling is often better than the weighted averaging pooling. At this moment, the adaptive hierarchical pooling can automatically learn a small sub-bag quantity, in other words, most signal frames belong to a same sub-bag, which increases a proportion of the maximum pooling. However, for a long-time or periodic sound event (such as "music" or "alarm sound"), there are a few noise clips, and event information is distributed in a whole long sequence. In this case, the weighted averaging pooling is often better than the maximum pooling. At this moment, the adaptive hierarchical pooling can automatically allocate lots of sub-bag quantities, in other words, a sub-bag contains a little frame information, which increases a proportion of the weighted averaging pooling. The adaptive pooling realizes an optimal pooling strategy formulated based on a natural attribute of a sound event, which is applicable to a more complex acoustic scene.

(3) The adaptive hierarchical pooling algorithm in the present disclosure is light in design, is implemented only depending on a set of learnable parameters, and can be easily and efficiently embedded into any acoustic model to complete a weakly-supervised sound event detection task.

The above embodiments are preferred implementations of the present disclosure, but the present disclosure is not limited to the above implementations. Any obvious improvement, substitution, or modification made by those skilled in the art without departing from the essence of the present disclosure should fall within the protection scope of the present disclosure.

What is claimed is:

1. A weakly-supervised sound event detection method based on adaptive hierarchical pooling, comprising:

extracting an acoustic feature of a pre-processed audio signal, inputting the acoustic feature to an acoustic model, dividing a frame-level prediction probability sequence predicted by the acoustic model into a plurality of consecutive sub-bags, calculating significant information of each of the sub-bags through maximum pooling to obtain a sub-bag-level prediction set, and obtaining an average probability of the sub-bag-level prediction set through mean pooling as a sentence-level prediction probability;

jointly optimizing the acoustic model and a relaxation parameter until convergence to obtain an optimal model weight and an optimal relaxation parameter, and formulating an optimal pooling strategy for each category of sound event based on the optimal relaxation parameter; and performing pre-processing and feature extraction on a given unknown audio signal to obtain a pre-processed audio signal, inputting the pre-processed audio signal to a trained acoustic model to obtain frame-level prediction probabilities of all target sound events to complete an audio locating task, and obtaining sentence-level prediction probabilities of all categories of the target sound events based on the optimal pooling strategy of each category of the target sound events to complete an audio classification task.

2. The weakly-supervised sound event detection method according to claim 1, wherein the formulating of the optimal pooling strategy specifically comprises: calculating, according to $\lambda = \{\text{softmax}(\alpha_k); \forall k\}$, probabilities $\lambda^*$ corresponding to different values of R under the optimal relaxation parameter, wherein for a $k^{th}$ category of sound event, R corresponding to a maximum selection probability in $\lambda^*_k$ is an optimal sub-bag quantity $R^*_k$ of a current category, $\lambda$ represents a probability set, R represents a sub-bag quantity, $\alpha_k$ represents a $k^{th}$-dimensional relaxation parameter, and softmax( ) represents an operator.

3. The weakly-supervised sound event detection method according to claim 2, wherein when the sub-bag quantity is R, a sentence-level prediction probability of the $k^{th}$ category of sound event is expressed as follows:

$$\hat{Y}_k = \phi_{hi}(F_w(X)_k, R) = \phi_{avg}(\{\phi_{max}(b_r); \forall_r\})$$

wherein $\hat{Y}_k$ represents the sentence-level prediction probability of the $k^{th}$ category of sound event, $\phi_{hi}$ represents an adaptive hierarchical pooling algorithm, $F_w$ represents the acoustic model, $\phi_{avg}$ represents the mean pooling, $\phi_{max}$ represents the maximum pooling, and $b_r$ represents an $r^{th}$ element in a sub-bag set B.

4. The weakly-supervised sound event detection method according to claim 3, wherein an expected sentence-level prediction probability $\overline{Y}_k$ of the $k^{th}$ category of sound event is as follows:

$$\overline{Y}_k = \Sigma_{R \in N^+}\{\lambda_k^R * \phi_{hi}(F_w(X)_k, R)\}$$

wherein $\lambda_k^R$ represents a probability of selecting R subbags for the $k^{th}$ category of event, and $N^+$ represents a set of all optional sub-bag quantities.

5. The weakly-supervised sound event detection method according to claim 4, wherein the jointly optimizing of the acoustic model and the relaxation parameter is performed through back propagation:

$$L(W, \alpha; X, Y) = \frac{1}{K}\sum_k^K BCELoss(\overline{Y}_k, Y_k)$$

wherein L represents an average prediction error of all sound event categories, W and $\alpha$ respectively represent a model parameter and the relaxation parameter, X and Y respectively represent a Mel spectrogram feature input to the model and a sentence-level label, $Y_k$ represents a sentence-level label of the $k^{th}$ category of sound event, BCELoss represents a binary cross-entropy function, and K represents a total quantity of the sound event categories.

6. The weakly-supervised sound event detection method according to claim 1, wherein the acoustic model is an arbitrary mainstream deep learning model, and a benchmark model of the acoustic model is a convolutional recurrent neural network model.

7. The weakly-supervised sound event detection method according to claim 1, wherein the extracted feature is a Mel spectrogram feature.

8. The weakly-supervised sound event detection method according to claim 7, wherein the acoustic model is trained and verified through a DCASE2017 dataset.

9. The weakly-supervised sound event detection method according to claim 8, wherein the audio signal is downsampled to 16 kHz, a frame length and a frame shift are set to 1024 and 664 respectively, 240 frame samples are obtained for each signal after framing, and the Mel spectrogram feature has 64 dimensions.

10. A system for implementing the weakly-supervised sound event detection method according to claim 1, comprising:

an acoustic model and an adaptive hierarchical pooling algorithm module that are successively connected, and a processor, configured to:

input a pre-processed and feature-extracted audio signal to the acoustic model, predict a frame-level prediction probability by executing the acoustic model, and aggregate the frame-level prediction probability by executing the adaptive hierarchical pooling algorithm module to obtain a sentence-level prediction probability.

11. A system for implementing the weakly-supervised sound event detection method according to claim 2, comprising:

an acoustic model and an adaptive hierarchical pooling algorithm module that are successively connected, and a processor, configured to:

input a pre-processed and feature-extracted audio signal to the acoustic model, predict a frame-level prediction probability by executing the acoustic model, and aggregate the frame-level prediction probability by executing the adaptive hierarchical pooling algorithm module to obtain a sentence-level prediction probability.

12. A system for implementing the weakly-supervised sound event detection method according to claim 3, comprising:

an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

13. A system for implementing the weakly-supervised sound event detection method according to claim 4, comprising:
an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

14. A system for implementing the weakly-supervised sound event detection method according to claim 5, comprising:
an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

15. A system for implementing the weakly-supervised sound event detection method according to claim 6, comprising:
an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

16. A system for implementing the weakly-supervised sound event detection method according to claim 7, comprising:
an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

17. A system for implementing the weakly-supervised sound event detection method according to claim 8, comprising:
an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

18. A system for implementing the weakly-supervised sound event detection method according to claim 9, comprising:
an acoustic model and an adaptive hierarchical pooling algorithm module that are successively connected, and
a processor, configured to:
input a pre-processed and feature-extracted audio signal to the acoustic model,
predict a frame-level prediction probability by executing the acoustic model, and
aggregate the frame-level prediction probability by executing the adaptive hierarchical pooling algorithm module to obtain a sentence-level prediction probability.

* * * * *